(12) United States Patent
Hsieh

(10) Patent No.: US 9,039,455 B2
(45) Date of Patent: May 26, 2015

(54) CAR CHARGER

(71) Applicant: DELTA ELECTRONICS, INC., Taoyuan County (TW)

(72) Inventor: Hung-Sheng Hsieh, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 41 days.

(21) Appl. No.: 13/804,642

(22) Filed: Mar. 14, 2013

(65) Prior Publication Data

US 2014/0141653 A1    May 22, 2014

(30) Foreign Application Priority Data

Nov. 16, 2012    (TW) .............................. 101142746 A

(51) Int. Cl.
*H01R 31/06*    (2006.01)
*H02J 7/00*    (2006.01)

(52) U.S. Cl.
CPC .............. *H01R 31/06* (2013.01); *H02J 7/0042* (2013.01); *H01R 31/065* (2013.01)

(58) Field of Classification Search
USPC .............. 439/638, 668, 218, 620.28; 320/107
See application file for complete search history.

(56) References Cited

U.S. PATENT DOCUMENTS

| | | | | |
|---|---|---|---|---|
| 5,261,838 A * | 11/1993 | Fujie | .............................. | 439/668 |
| 5,263,879 A * | 11/1993 | Sasa et al. | ...................... | 439/668 |
| 5,569,053 A * | 10/1996 | Nelson et al. | .................. | 439/668 |
| 5,857,866 A | 1/1999 | Felps | | |
| 5,897,397 A * | 4/1999 | Yokozawa | ..................... | 439/668 |
| 5,964,623 A * | 10/1999 | Maher et al. | ................... | 439/668 |
| 6,135,798 A * | 10/2000 | Saruta et al. | ................... | 439/259 |
| 6,312,289 B1 * | 11/2001 | Saji | .............................. | 439/668 |
| 6,641,405 B2 * | 11/2003 | Chou | .............................. | 439/32 |
| 6,705,901 B1 * | 3/2004 | Lin | .............................. | 439/668 |
| 7,427,216 B1 * | 9/2008 | Wu et al. | ....................... | 439/638 |
| 8,547,056 B2 * | 10/2013 | Chang | ........................... | 320/107 |
| 2004/0040733 A1 | 3/2004 | Yuasa et al. | | |
| 2010/0295504 A1 * | 11/2010 | Lin | .............................. | 320/107 |
| 2011/0254500 A1 * | 10/2011 | Lee et al. | ...................... | 320/107 |
| 2014/0141653 A1 * | 5/2014 | Hsieh | ........................... | 439/638 |

FOREIGN PATENT DOCUMENTS

| | | |
|---|---|---|
| DE | 202012001273 | 3/2012 |
| GB | 2293054 | 3/1996 |
| GB | 2214727 | 9/1999 |
| GB | 2338610 | 12/1999 |
| WO | 9117590 | 11/1991 |
| WO | 2006025510 | 3/2006 |

OTHER PUBLICATIONS

Search Report dated May 10, 2013 from corresponding No. EP 13157624.1-1804.

* cited by examiner

*Primary Examiner* — Alexander D Gilman

(74) *Attorney, Agent, or Firm* — Lowe Hauptman & Ham, LLP

(57) ABSTRACT

A car charger includes a charger body, a cathode conducting elastic sheet and an auxiliary elastic sheet. The charger body has a housing and a holder. The cathode conducting elastic sheet has two elastic conduction arms clamped between the housing and holder. Each elastic conduction arm has a protrusion exposed out of each through hole. The auxiliary elastic sheet has two elastic sections disposed between the holder and the protrusion. The elastic sections will provide a resilience force to the protrusion when being squeezed.

11 Claims, 10 Drawing Sheets

CAR CHARGER

BACKGROUND OF THE INVENTION

1. Field of the Invention

The present invention generally relates to a charger and, in particular to a car charger.

2. Description of Related Art

With the popularity of modern technology products and the trend of using technology products at will, more and more people carry technology products such as mobile phone, notebook computer, PDA (Personal Digital Assistant) and so on. In order to supply sufficient power of these products for normal use and save precious time, people usually charge their technology products by using a car cigarette lighter socket when they are driving.

A traditional car charger comprises a charger body. An anode electrode is protruded from a front end of the charger body, and metal sheets, as cathode electrodes, are exposed out of two sides of the charger body. Plug the car charger in the car cigarette lighter socket, then the anode electrode and the cathode electrodes will connect with electrodes of the car cigarette lighter socket respectively, whereby the technology products can be charged. The charging current is usually a direct current, and a normal voltage value is 12 V.

However, technology products are required to have a thin shape and a light weight nowadays. The volume of a traditional car charger becomes small, and a preserved inner space of the charger body for accommodating metal sheets will be reduced. Hence, metal sheets must have a small size or a thin shape. Under such a situation, when the metal sheets are squeezed by a car cigarette lighter socket or a user, the metal sheets will be deformed and shrunk inward the charger body. Thus the car charger cannot plug in the cigarette lighter socket firmly. Moreover, a short circuit will happen if the metal sheets contact electronic components of the circuit board.

In view of the above drawbacks, the Inventor proposes the present invention based on his expert knowledge and elaborate researches in order to solve the problems of prior art.

SUMMARY OF THE INVENTION

Accordingly, an object of the present invention is to provide a car charger, in which the elastic sections will provide a resilience force to the protrusion when being squeezed. The elastic conduction arm will return to its original position and can be avoided from shrinking into the housing. A solid structure and a stable use condition of the car charger will be achieved.

In order to achieve the object mentioned above, the present invention provides a car charger. The car charger includes a charger body, a cathode conducting elastic sheet and an auxiliary elastic sheet. The charger body includes a housing and a holder accommodated therein. Two through holes are disposed on two opposite sides of the housing. The cathode conducting elastic sheet has two elastic conduction arms, and each of the elastic conduction arms is clamped between the housing and holder. Each elastic conduction arm has a protrusion exposed out of each through hole. The auxiliary elastic sheet has two elastic sections, and each of the elastic sections is disposed between the holder and the protrusion separately.

The present invention has following effects:

Firstly, each elastic section is disposed between the holder and the protrusion. When the protrusion is squeezed by a cigarette lighter socket or a user, the elastic section will provide a resilience force to the protrusion. Thus the elastic conduction arms will return to the original position, and the elastic conduction arms can be avoided from shrinking into the charger body. The car charger will plug in the cigarette lighter socket more firmly, and a solid structure of the car charger will be achieved.

Secondly, the car charger of the present invention further includes a circuit board fixed in the holder. The elastic section will resist the elastic conduction arm from approaching to the circuit board. Thus the elastic conduction arm will not touch the electronic components of the circuit board, and a short circuit will not happen. A car charger with good security will be achieved.

Thirdly, the car charger of the present invention makes use of the elastic section of the auxiliary elastic sheet to enhance the resilience of the cathode conducting elastic sheet. Therefore, the cathode conducting elastic sheet still has a good resilient force in a condition that the cathode conducting elastic sheet has a small size or a thin shape. And the car charger can be developed to be thinner and lighter.

Fourthly, the holder has a bump and two blocks. The auxiliary elastic sheet is an elastic body. The elastic body can be a torsion spring and a loop is provided in the middle thereof. The loop is sleeved on the bump, and the two blocks clamps both ends of the torsion spring separately. Otherwise, the elastic body can be a resilient sheet having a penetrating hole, and the resilient sheet covers on the bump through the penetrating hole. Two bumps block both ends of the resilient sheet separately. In this way, the auxiliary elastic sheet can be fixed in the holder easily, and the convenience of the car charger assembly will be improved.

Fifthly, each of the elastic conduction arms forms an accommodating slot at a location of the protrusion. There is an extension section extended at an end of each elastic section, and the extension section is accommodated in the accommodating slot correspondingly. Because the extension section is positioned in the protrusion, the protrusion will press the extension section when the protrusion is squeezed by a cigarette lighter socket or a user. The extension section and the elastic sections will provide a resilience force to the protrusion together for stabilizing the springs in parallel.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

Figure 1:
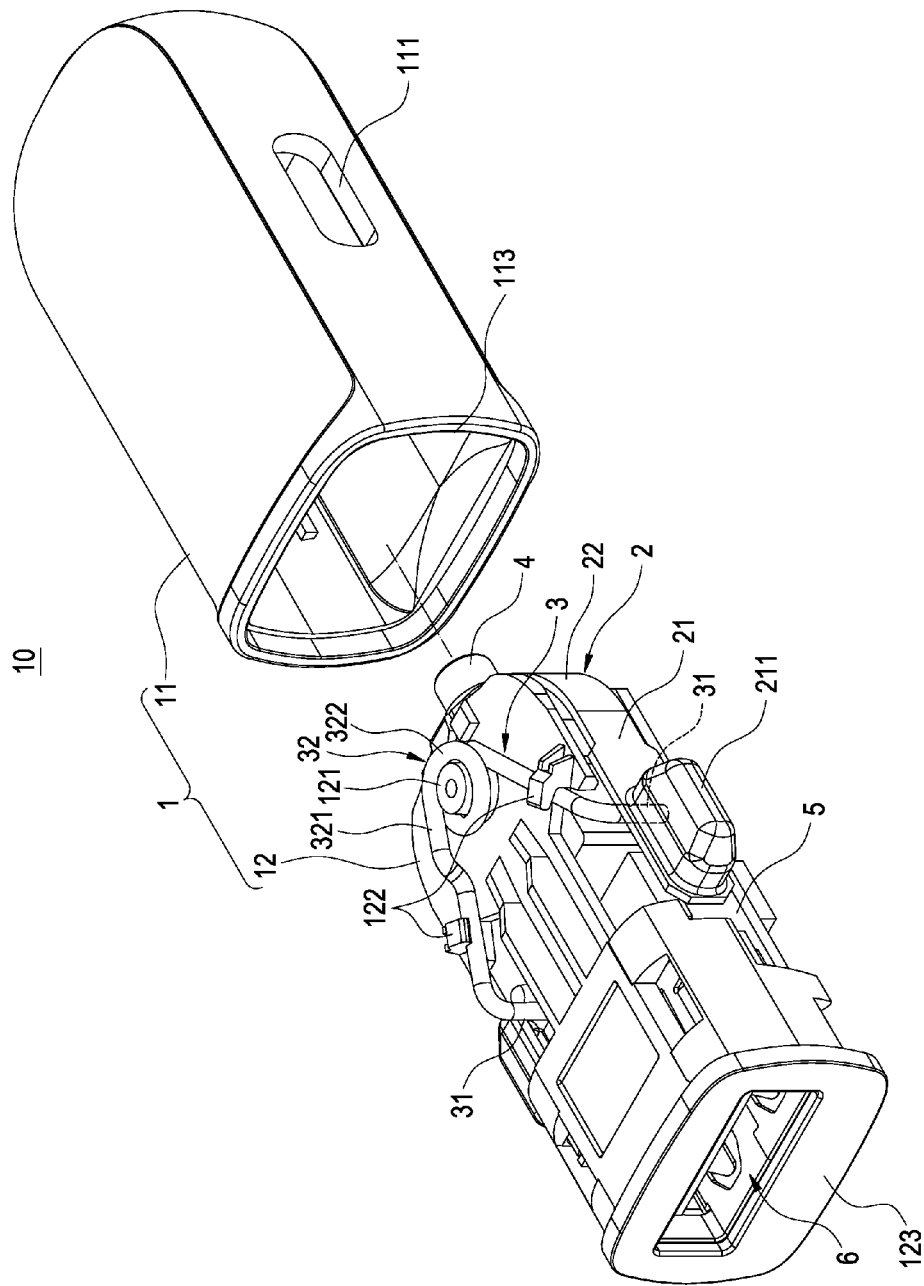
FIG. 1 is an exploded perspective view of a car charger according to the present invention.
Figure 2:
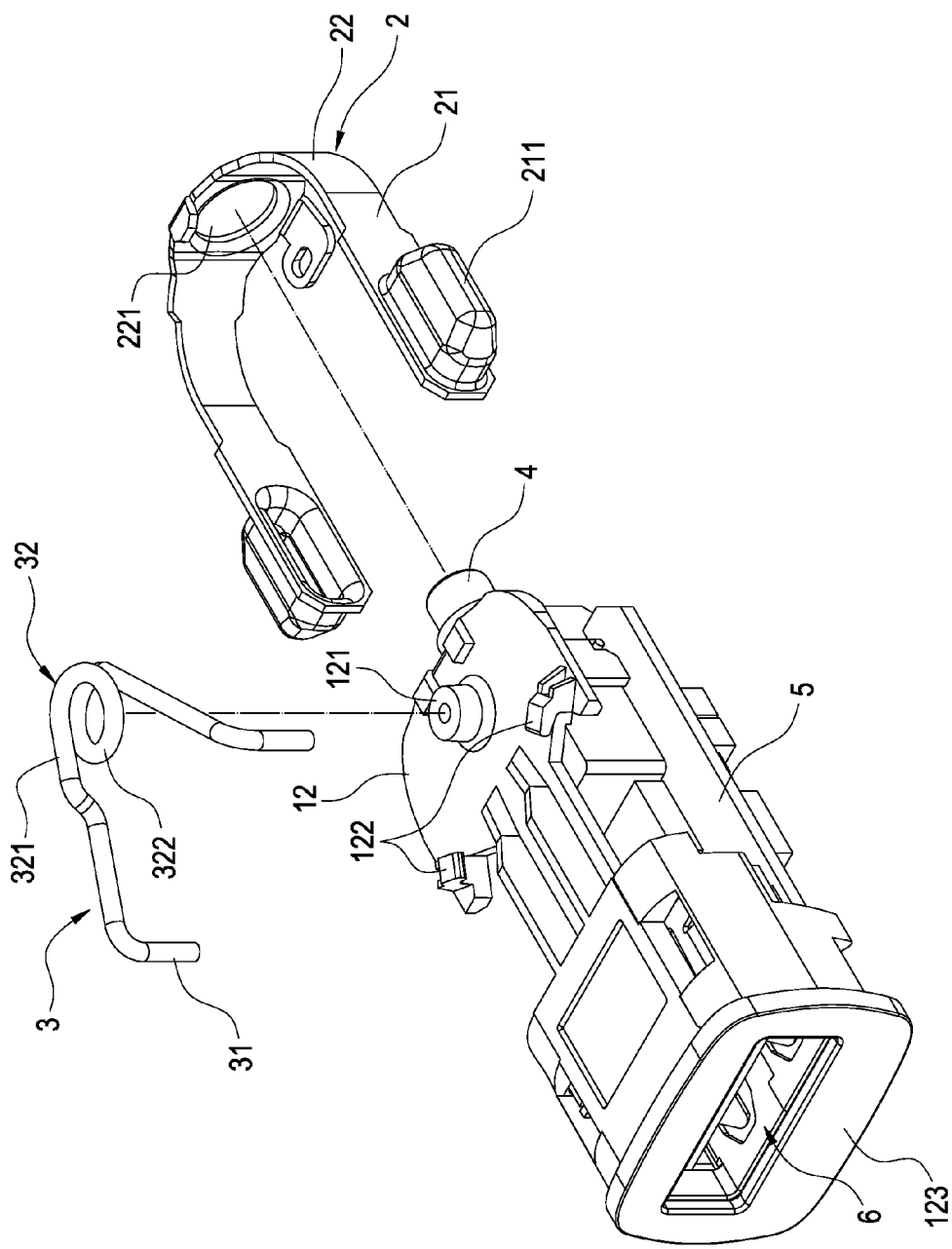
FIG. 2 is another exploded perspective view of a car charger according to the present invention.
Figure 3:
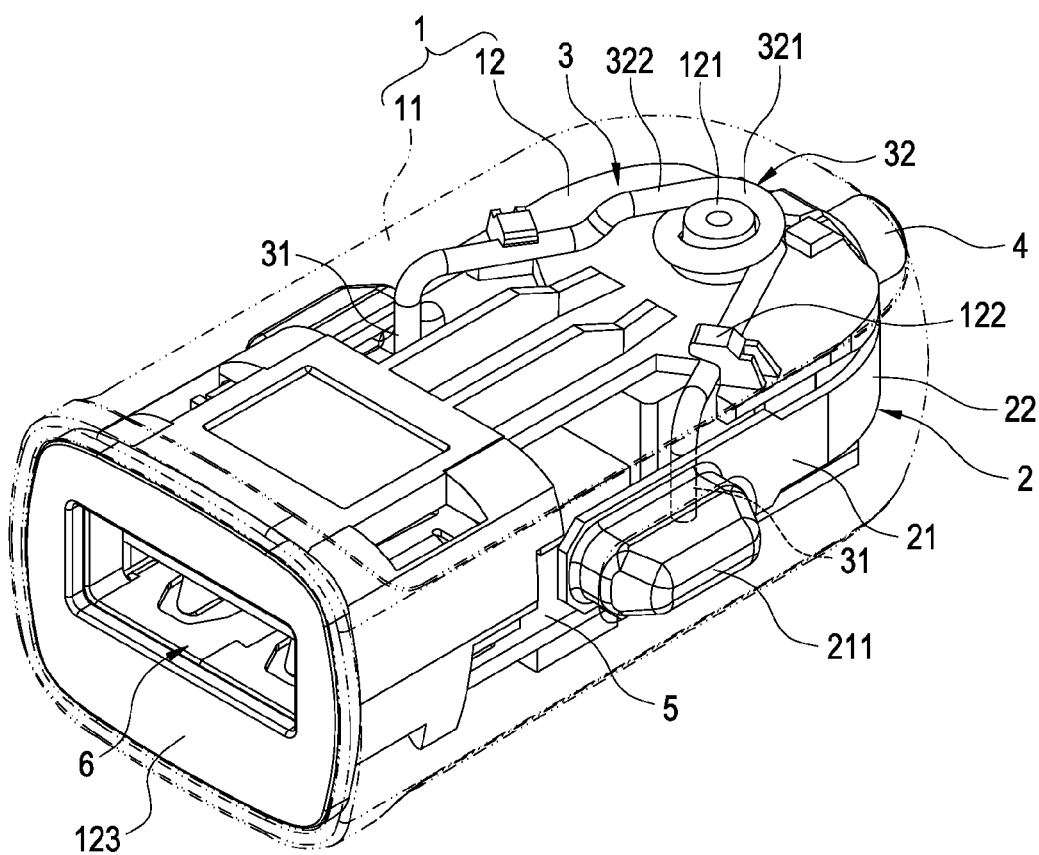
FIG. 3 is a perspective assembled view of a car charger according to the present invention.
Figure 4:
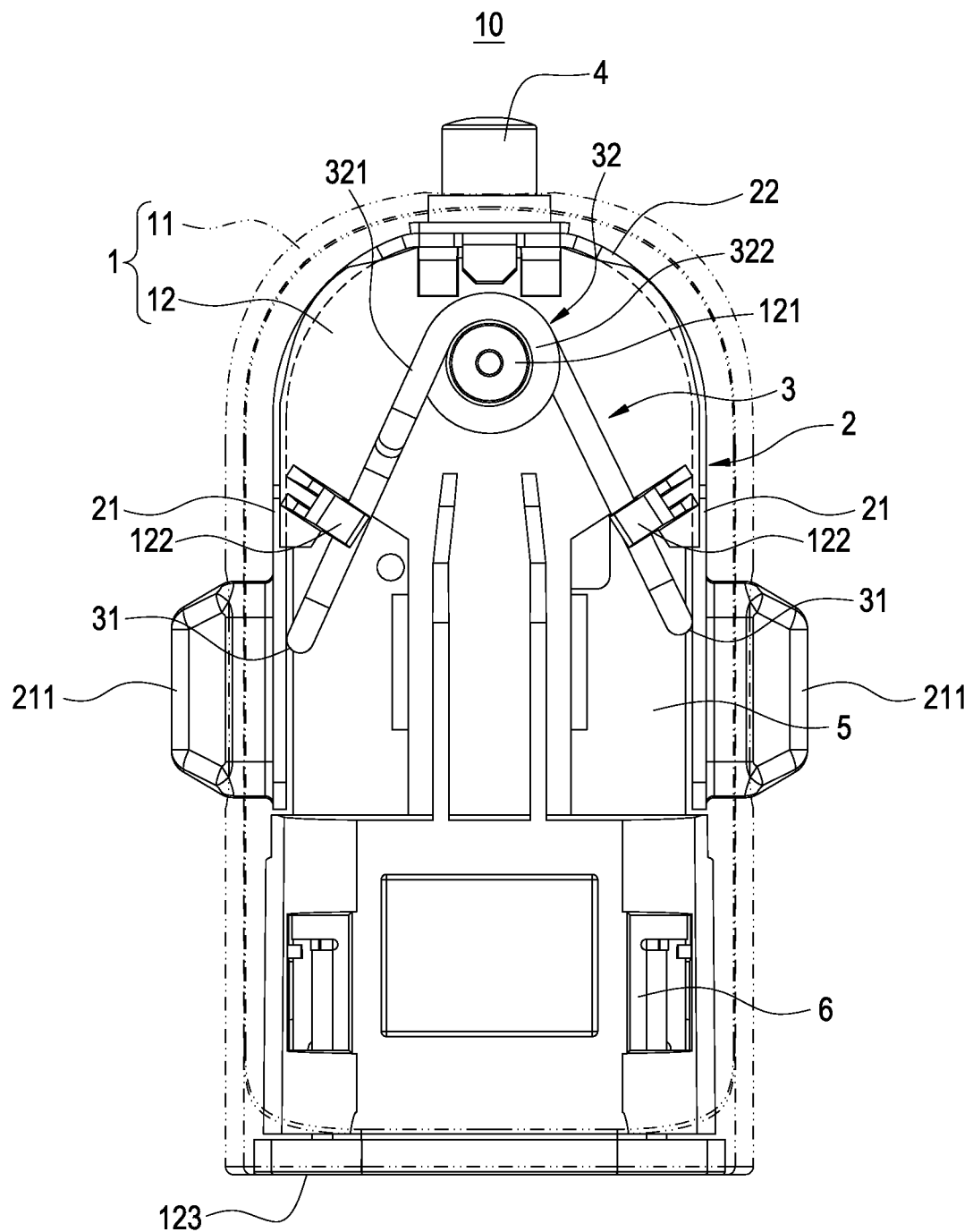
FIG. 4 is an assembled schematic view of a car charger according to the present invention.
Figure 5:
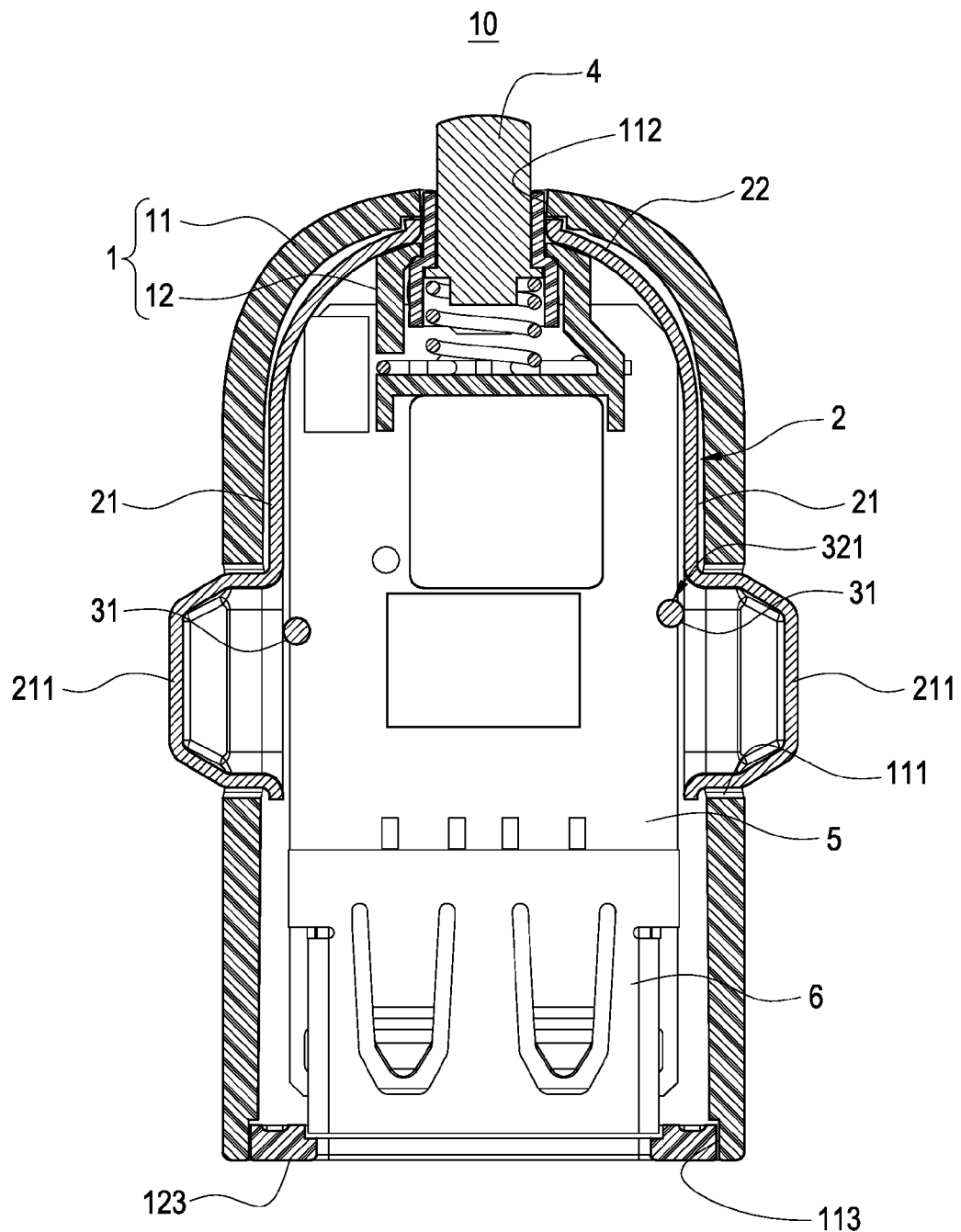
FIG. 5 is a cross sectional view of a car charger according to the present invention.

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Please refer to FIG. 1 to FIG. 5. The present invention provides a car charger. The car charger includes a charger body (1), a cathode conducting elastic sheet (2) and an auxiliary elastic sheet (3).

The charger body (1) includes a housing (11) and a holder (12) accommodated in the housing (11). More detail description is as following. The housing (11) and the holder (12) are made of insulation material such as plastic. Two through holes (111) are disposed on two opposite sides of the housing (11). The housing (11) has an opening (112) at one end and an aperture (113) at the other end. The holder (12) is inserted in the housing (11) through the aperture (113). A bump (121) and two blocks (122) are extended from the holder (12), and the holder (12) has an end (123) exposed out of the housing (11).

The cathode conducting elastic sheet (2) has two elastic conduction arms (21). Each of the elastic conduction arms (21) is clamped between the housing (11) and holder (12). Each elastic conduction arm (21) has a protrusion (211) exposed out of each through hole (111). Detail description is as following. The cathode conducting elastic sheet (2) is a U-shaped metal clip (22) but not limited to. Two ends of the U-shaped metal clip (22) are formed as two elastic conduction arms (21), and the U-shaped metal clip (22) has a hole (221).

The auxiliary elastic sheet (3) has two elastic sections (31), and each of the elastic sections (31) is disposed between the holder (12) and the protrusion (211). More detail is described as following. The auxiliary elastic sheet (3) is an elastic body (32) fixed in the holder (12). Two ends of the elastic body (32) are extended to form as two elastic sections (31). In a preferred embodiment, the elastic body (32) is a torsion spring (321), and it can be adjusted depend on practical situation. The torsion spring (321) is formed in a V shape and two ends of the torsion spring (321) are formed as the elastic section (31) separately. A loop (322) is provided in a middle portion of the torsion spring (321). The loop (322) is sleeved on the bump (121), and two blocks (122) clamp both ends of the torsion spring (321) separately.

The car charger of the present invention further comprises an anode conduction piece (4), a circuit board (5) and a socket (6). The anode conduction piece (4) and the circuit board (5) are fixed in the holder (12). The anode conduction piece (4) passes through the opening (112) and exposes out of the housing (11) partially. The circuit board (5) is electrically connected with the cathode conducting elastic sheet (2) and anode conduction piece (4). The socket (6) is disposed in the end (123) and electrically connected with the circuit board (5). This socket (6) is a USB standard socket but not limited to. Moreover, the U-shaped metal clip (22) covers the anode conduction piece (4) through the hole (221) at outer peripheral of the holder (12).

In an assembly of the car charger 10 of the present invention, the charger body (1) has a housing (11) and a holder (12) accommodated in the housing (11). Two through holes (111) are disposed on two opposite sides of the housing (11). The cathode conducting elastic sheet (2) has two elastic conduction arms (21), and each of the elastic conduction arms (21) is clamped between the housing (11) and holder (12). Each elastic conduction arm (21) has a protrusion (211) exposed out of each through hole (111). The auxiliary elastic sheet (3) has two elastic sections (31), and each of the elastic sections (31) is disposed between the holder (12) and the protrusion (211) separately.

Therefore, each elastic section (31) is disposed between the holder (12) and the protrusion (211) so that the elastic sections (31) will provide a resilience force to the protrusion (211) for returning the elastic conduction arms (21) to the original position when the protrusion (211) is squeezed by a cigarette lighter socket or a user. Thus the elastic conduction arms (21) can be avoided from shrinking into housing (11). The car charger (10) will plug in the cigarette lighter socket more firmly, and a solid structure of the car charger (10) will be achieved.

Moreover, the car charger of the present invent further includes a circuit board (5) fixed in the holder (12). The elastic sections (31) will resist the elastic conduction arms (21) from approaching to the holder (12). In other words, the elastic sections (31) will prevent the elastic conduction arm (21) from closing to the circuit board (5). Thus the elastic conduction arm (21) will not touch the electronic components of the circuit board (5), and a short circuit will not happen. A car charger (10) with good security will be achieved.

Furthermore, the car charger (10) of the present invention makes use of the elastic section (31) of the auxiliary elastic sheet (3) to enhance the resilience of the cathode conducting elastic sheet (2). Therefore, the cathode conducting elastic sheet (2) will still have a good resilient force in a condition that the cathode conducting elastic sheet (2) has a small size or a thin shape. Therefore, the car charger (10) can be developed to be thinner and lighter.

Besides, the holder (12) has a bump (121) and two blocks (122), and the auxiliary elastic sheet (3) is an elastic body (32). The elastic body (32) can be a torsion spring and a loop (322) is provided in the middle thereof. The loop (322) is sleeved on the bump (121), and the two blocks (122) clamp both ends of the torsion spring (321) separately. In this way, the auxiliary elastic sheet (3) can be fixed in the holder (12) easily, and the convenience of the car charger (10) assembly will be improved.

Figure 6:
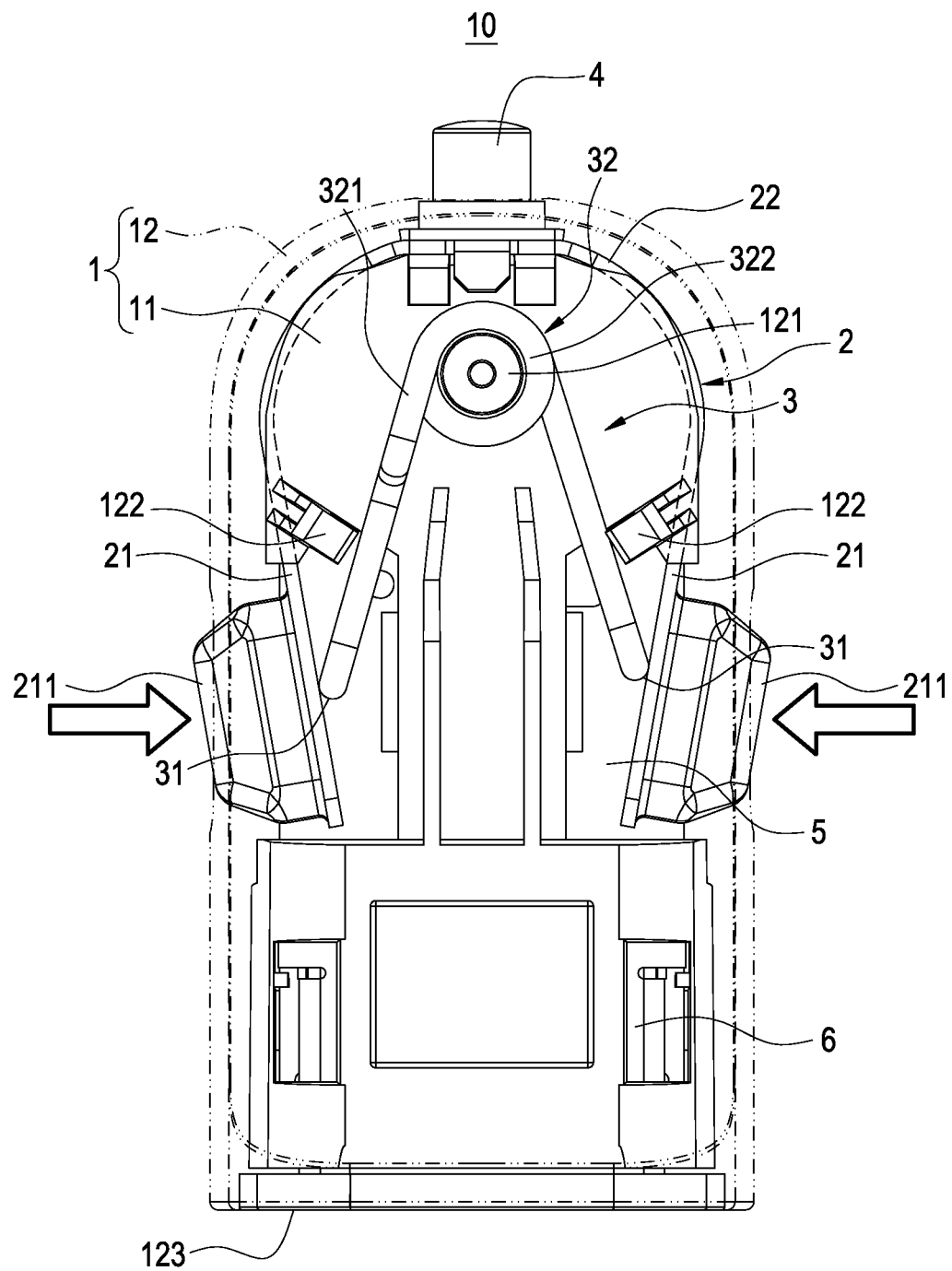
FIG. 6 is an application schematic view of a car charger according to the present invention.
Figure 7:
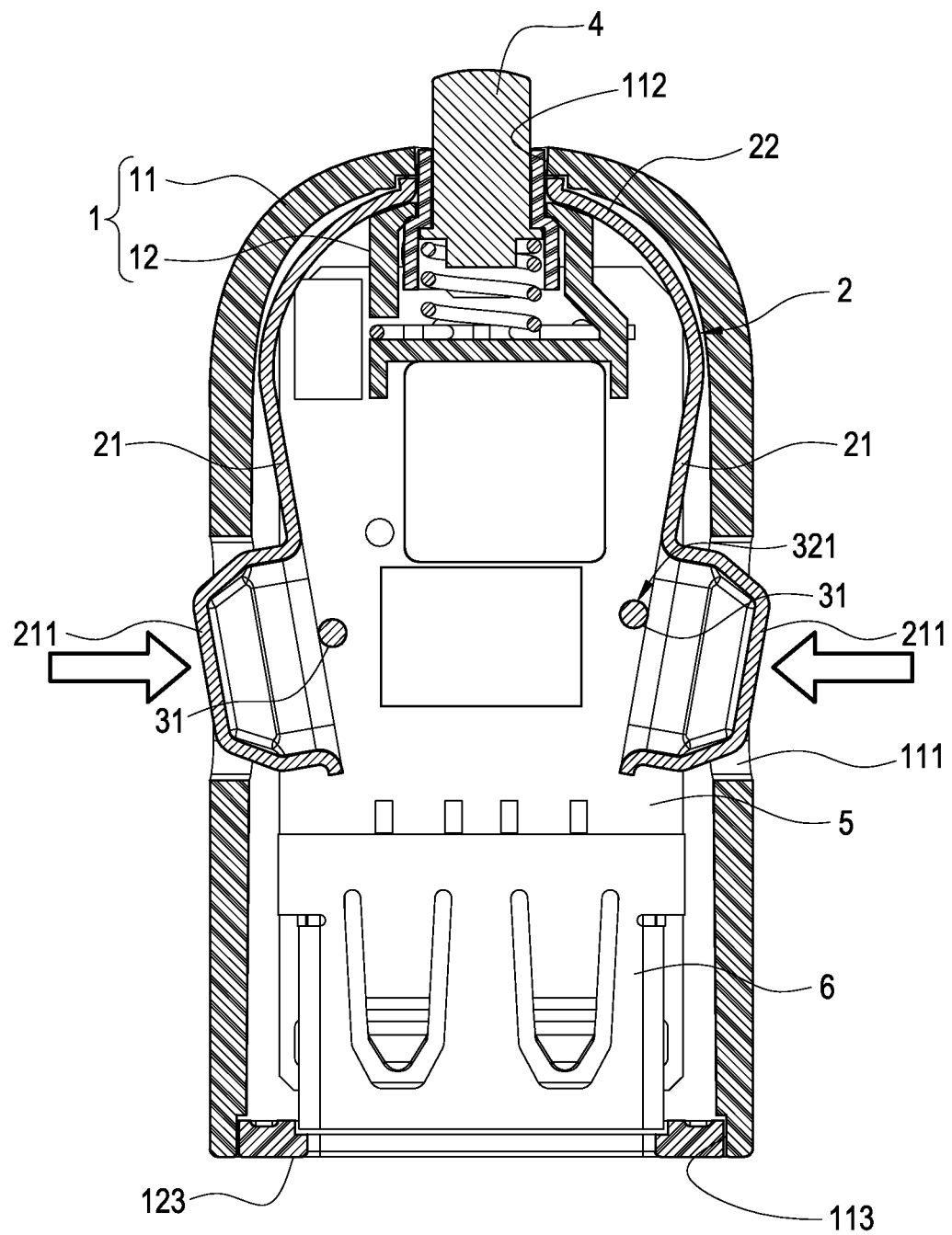
FIG. 7 is another application schematic view of a car charger according to the present invention.

Please refer to FIG. 6 and FIG. 7; they depict application schematic views of a car charger according to the present invention. Firstly, when the protrusion (211) is squeezed by a cigarette lighter socket or a user, the protrusion (211) will be forced and shrunk into the housing (11) with the elastic conduction arm (21). Moreover, the elastic section (31) will provide a resilience force to the protrusion (211) for enhancing the resilience force of the elastic conduction arm (21). Thus the elastic conduction arms (21) will return to the original position quickly.

Figure 8:
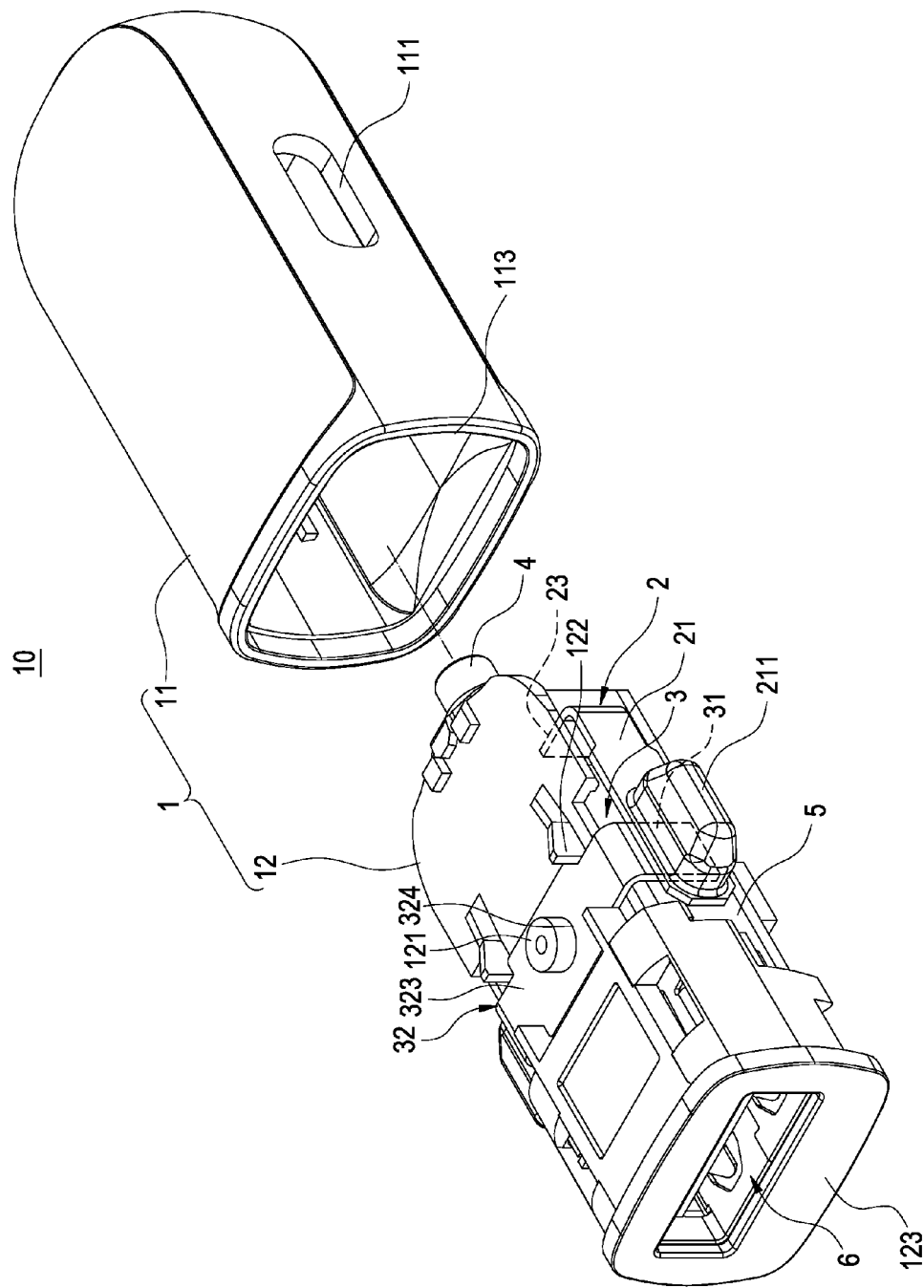
FIG. 8 is another perspective view of a car charger of another embodiment according to the present invention.

Please refer to FIG. 8; it depicts another embodiment of a car charger of the present invention. Wherein, the auxiliary elastic sheet (3) has two elastic sections (31). Each of the elastic sections (31) is fixed in the holder (12), and two elastic conduction arms (21) are extended from each metal sheet (23). In a preferred embodiment, the elastic body (32) is a resilient sheet (323), and two ends of the elastic body (32) are extended to form as two elastic sections (31). The resilient sheet (323) has a penetrating hole (324), and the resilient sheet (323) covers on the bump (121) through the penetrating hole (324). Two bumps (121) clamp an end of two resilient sheets (323) separately. In this way, described functions and effects will be achieved.

Furthermore, a bump (121) and two blocks (122) are extended from the holder (12). The auxiliary elastic sheet (3) is an elastic body (32), and the elastic body (32) can be a resilient sheet (323). The resilient sheet (323) has a penetrating hole (324), and the resilient sheet (323) covers on the bump (121) through the penetrating hole (324). Two bumps (121) clamp both ends of the resilient sheets (323) separately. The auxiliary elastic sheet (3) can be positioned in the holder (12) easily, and the convenience of the car charger assembly will be improved.

Figure 9:
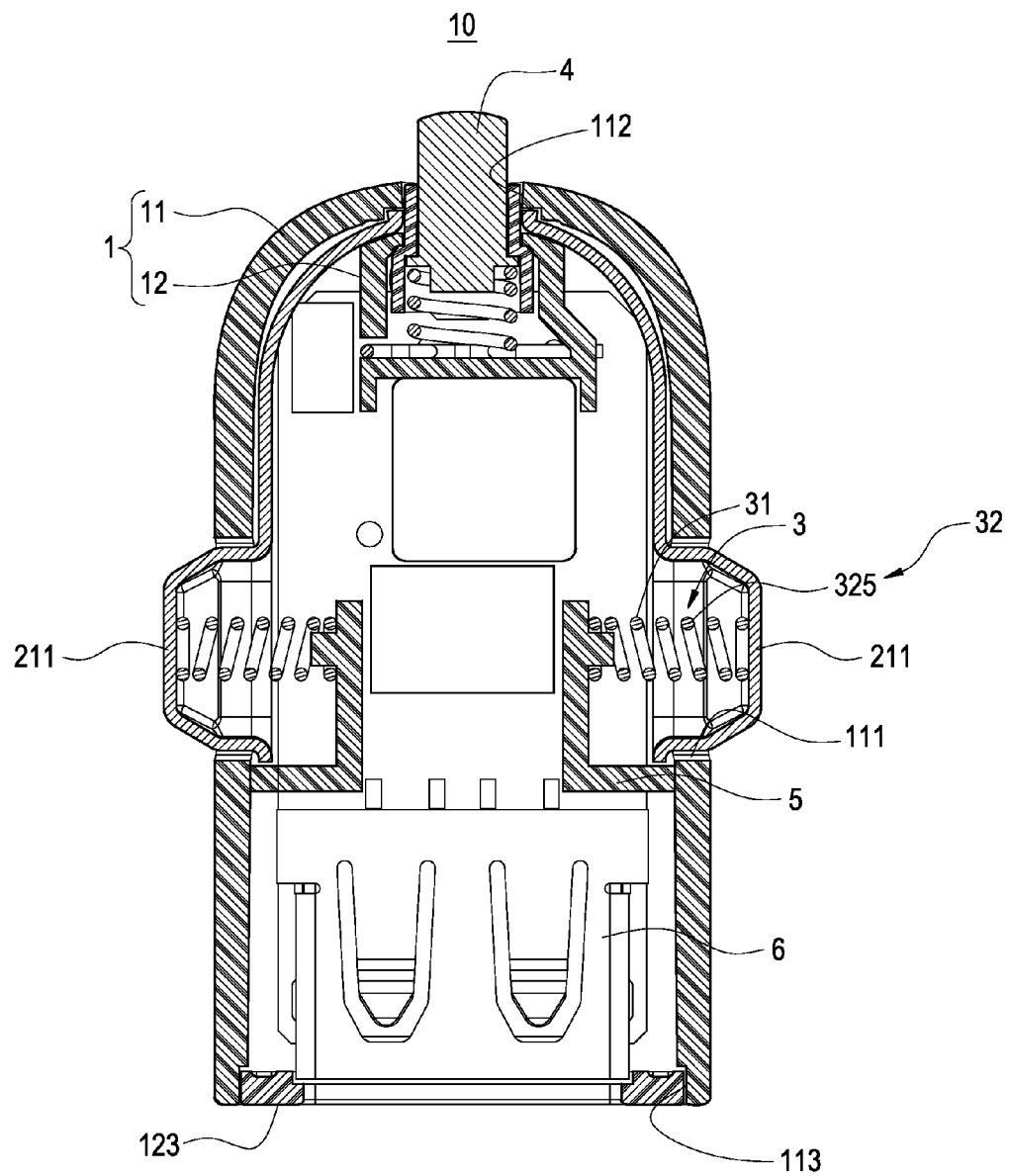
FIG. 9 is a cross sectional view of a car charger of a further embodiment according to the present invention.

Please refer to FIG. 9; it depicts a car charger of a further embodiment of the present invention. The auxiliary elastic sheet (3) includes two elastic bodies (32) fixed in the holder (12), and each elastic body (32) is formed as an elastic section (31). The elastic body (32) is a coil spring (325), and the coil spring (325) is formed as an elastic section (31) itself. The coil spring (325) is clamped between holder (12) and the protrusion (211). In this way, described functions and effects will be achieved.

Figure 10:
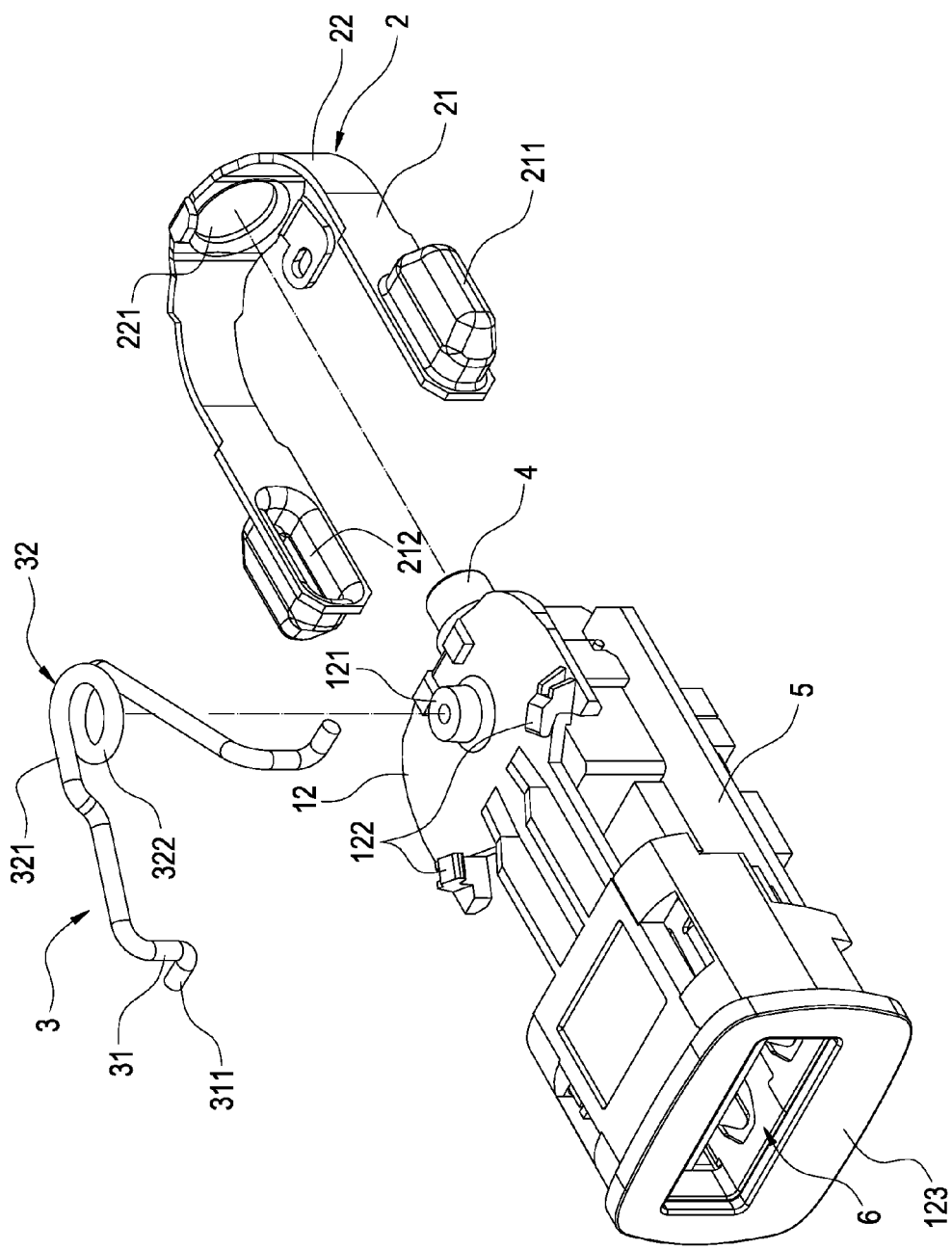
FIG. 10 is another perspective exploded view of a car charger according to the present invention.

Please refer to FIG. 10; it depicts a car charger of another embodiment of the present invention. Wherein, each of the elastic conduction arms (21) forms an accommodating slot (212) at a location of the protrusion (211). An extension section (311) is extended at an end of each elastic section (31), and the extension section (311) is accommodated in the accommodating slot (212) correspondingly. As the extension section (311) is positioned in the protrusion (211), the protrusion (211) will press the extension section (311) when the protrusion (211) is squeezed by a cigarette lighter socket or a user. The extension section (311) and the elastic sections (31) will provide a resilience force to the protrusion (211) together for stabilizing the springs in parallel.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A car charger, comprising:
   a charger body, including a housing and a holder accommodated in the housing, two through holes disposed on two opposite sides of the housing;
   a cathode conducting elastic sheet, having two elastic conduction arms, each of the elastic conduction arms clamped between the housing and the holder, and each elastic conduction arm having a protrusion exposed out of each through hole; and
   a torsion spring, two ends of the torsion spring extended to form two resisting sections, each of the resisting sections disposed between the holder and one of the protrusions.

2. The car charger according to claim 1, wherein the torsion spring is in a V shape and a loop is provided in a middle portion of the torsion spring, a bump and two blocks are extended from the holder, the loop is sleeved on the bump and the two blocks clamp both ends of the torsion spring separately.

3. The car charger according to claim 1, wherein each of the elastic conduction arms forms an accommodating slot at a location of the protrusion, an extension section is extended at an end of each resisting section, and each extension section is accommodated in the accommodating slot correspondingly.

4. The car charger according to claim 1, further comprising an anode conduction piece and a circuit board fixed in the holder, wherein one end of the housing has an opening, the anode conduction piece passes through the opening and exposes out of the housing partially, and the circuit board is electrically connected with the cathode conducting elastic sheet and the anode conduction piece.

5. The car charger according to claim 1, wherein the cathode conducting elastic sheet is a U-shaped metal clip and two ends of the U-shaped metal clip are formed as the elastic conduction arms.

6. The car charger according to claim 4, further comprising an anode conduction piece fixed in the holder, wherein the U-shaped metal clip has a hole and the U-shaped metal clip covers on the anode conduction piece through the hole at an outer periphery of the holder.

7. The car charger according to claim 1, wherein the cathode conducting elastic sheet includes two metal sheets, each metal sheet is fixed in the holder, and each of the two elastic conduction arms is extended from each metal sheet.

8. The car charger according to claim 1, wherein the housing has an aperture and the holder is positioned in the housing through the aperture.

9. The car charger according to claim 1, further comprising a circuit board and a socket, wherein the circuit board is fixed in the holder, the holder has an end exposed out of the housing, and the socket is disposed in the end and electrically connected with the circuit board.

10. A car charger, comprising:
    a charger body, including a housing and a holder accommodated in the housing, two through holes disposed on two opposite sides of the housing;
    a cathode conducting elastic sheet, having two elastic conduction arms, each of the elastic conduction arms clamped between the housing and the holder, and each elastic conduction arm having a protrusion exposed out of each through hole; and
    a torsion spring having an elastic body fixed in the holder, wherein two ends of the torsion spring are extended to form two resisting sections disposed between the holder and the two protrusions, each of the resisting sections abutting against a corresponding protrusion exposed out of each through hole.

11. The car charger according to claim 10, wherein the torsion spring is in a V shape and a loop is provided in a middle portion of the torsion spring, a bump and two blocks are extended from the holder, the loop is sleeved on the bump and the two blocks clamp both ends of the torsion spring separately.

* * * * *